United States Patent [19]
Seward, III

[11] Patent Number: 5,175,466
[45] Date of Patent: Dec. 29, 1992

[54] FIXED GEOMETRY PLASMA AND GENERATOR

[76] Inventor: DeWitt C. Seward, III, P.O. Box 261, Acton, Mass. 01720

[21] Appl. No.: 841,308

[22] Filed: Feb. 24, 1992

Related U.S. Application Data

[63] Continuation of Ser. No. 529,783, May 25, 1990, abandoned, which is a continuation of Ser. No. 214,904, Jun. 28, 1988, abandoned, which is a continuation of Ser. No. 914,629, Oct. 2, 1986, abandoned.

[51] Int. Cl.⁵ .............................................. H05H 1/46
[52] U.S. Cl. ................................ 313/231.31; 328/233
[58] Field of Search .................... 313/231.31; 328/233; 376/127, 128, 129, 133, 137, 139

[56] References Cited

U.S. PATENT DOCUMENTS

| | | |
|---|---|---|
| 2,233,779 | 3/1941 | Fritz . |
| 2,993,851 | 7/1961 | Thomson et al. . |
| 3,029,199 | 4/1962 | Baker et al. ............................ 376/137 |
| 3,141,826 | 7/1964 | Friedrichs et al. .................... 376/137 |
| 3,155,594 | 11/1964 | Lehnert et al. ....................... 376/137 |
| 3,255,404 | 6/1966 | Kidwell . |
| 3,626,305 | 12/1971 | Furth et al. ........................... 376/139 |

OTHER PUBLICATIONS

*Physics for Scientists and Engineeers*; Radin et al, 1982 pp. 559, 560.
Knief, *Nuclear Energy Technology*, 1981 pp. 510, 511 and 516.
Singer, Stanley, "The Nature of Ball Lightning", Plenum Press (1971).
Daugherty, J. D. and R. H. Levy, "Equilibrium of Electron Clouds in Toroial Magnetic Fields", *Physics of Fluids* 10, 155 (1967).

*Primary Examiner*—Sandra L. O'Shea
*Attorney, Agent, or Firm*—Hamilton, Brook, Smith & Reynolds

[57] ABSTRACT

A fixed geometry plasma and a method of generating such a plasma wherein a stream of charged particles follows a spiral path. Said spiralling plasma is containable in a magnetic field such that a toroid is formed.

10 Claims, 4 Drawing Sheets

ARROWS INDICATE DIRECTION OF PARTICLE FLOW

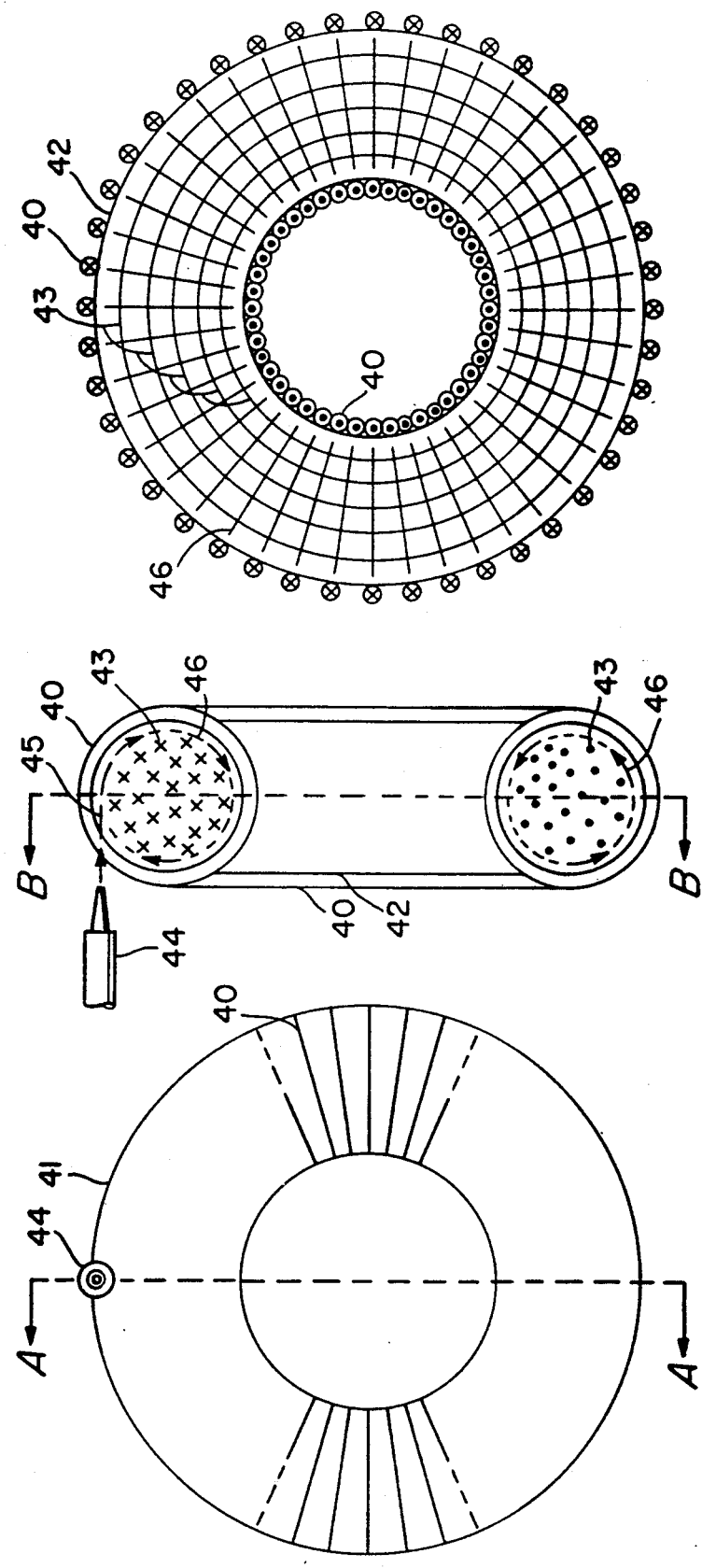

FIXED GEOMETRY PLASMA AND GENERATOR

This is a continuation of co-pending application Ser. No. 07/529,783 filed on May 25, 1990 now abandoned, which is a continuation of 07/214,904 filed Jun. 28, 1988 now abandoned, which is a continuation of 06/914,629 filed Sept. 10, 1986 now abandoned.

FIELD OF THE INVENTION

Resides in the field of technology of fixed geometry plasmas and the generation of said plasmas.

The following document was submitted on Dec. 13, 1984, pursuant to the Disclosure document program.

BACKGROUND OF THE INVENTION

This invention relates to plasmas of fixed geometry and the generation of said plasmas. For purposes of this patent, a plasma is defined as a collection of charged particles of like charge. At the present time, fixed geometry plasmas are difficult to contain and utilize. One notable use of plasmas is in fusion reactors wherein a plasma is raised to high energy levels and contained within gigantic magnets. The plasma is amorphous in shape in that it is contained as a large mass held in place by magnetic fields. It also includes particles o unlike charges. A second notable use of a plasma is in particle accelerators such as cyclotrons where charged particles are raised to high energy levels and contained by complex magnets. The shape of the mass of charged particles is essentially amorphous. A third use of charged particles is for electron beams. These beam are useful for welding and deposition, but are transient in nature and of a simple, line geometry.

What would be useful would be a plasma geometry that is fixed rather than amorphous. A fixed geometry requires the particles to move in definable paths. When so configured, the plasma will be containable and controllable to a far greater degree than an amorphous plasma. When so configured, energy can be added or removed in a well defined an controlled manner opening new possibilities for energy storage. Some fixed geometry plasmas are known to be self sustaining without external fields, opening new possibilities for energy storage, lighting, and particle acceleration.

An object of the present invention is the creation of a stable and controllable plasma of fixed geometry.

Another objects is to provide a generator for a fixed geometry plasma.

Another objective is to provide a specific toroidal (ring shaped) plasma.

Another objective is to provide a generator for a toroidal plasma.

Another objective is to shape a plasma into a toroid using a magnetic field generated by a charged particle beam, a single conductor, or a toroidal conductor coil.

Another objective is to provide a self sustaining fixed geometry toroidal plasma.

SUMMARY OF THE INVENTION

A plasma is shaped into a fixed and stable geometric form in which the direction of flow of the charged particles is definable and predictable. In one embodiment of the invention, the shape is a toroid. In another it is an elongated toroid. The number of shapes of fixed geometry plasmas is infinite.

A fixed geometry plasma generator is also described. It consists of a vacuum, a charged particle source, and a circular magnetic field. In one embodiment of the fixed geometry plasma generator a single conductor is used to generate a circular magnetic field. In another embodiment a charged particle beam is sued to generate a circular magnetic field. In another embodiment a toroid conductor coil is used to generate a circular magnetic field. Described is a simple way to modify the toroid coil to generate an infinite family of fixed geometry plasmas.

The novel features of this invention are set forth in detail in the appended claims. The invention will best be understood when read in conjunction with the accompanying drawings and descriptions.

BRIEF DESCRIPTION OF THE DRAWINGS

FIG. 5. The top view of the toroidal conductor coil.

FIG. 6. The cross sectional view of the toroidal conductor coil with a toroid plasma internal.

FIG. 7. The cutaway top view of the toroidal conductor coil with details of the internal toroid plasma.

DESCRIPTION OF THE PREFERRED EMBODIMENT a plasma is defined as a collection of charged particles of the same charge. Examples of charged particles are electrons and ions.

A toroid is defined as a surface generated by the rotation of a plane closed curve about an axis in the plane. A typical toroid has a donut shape in the three dimensional configuration.

Figure 1:
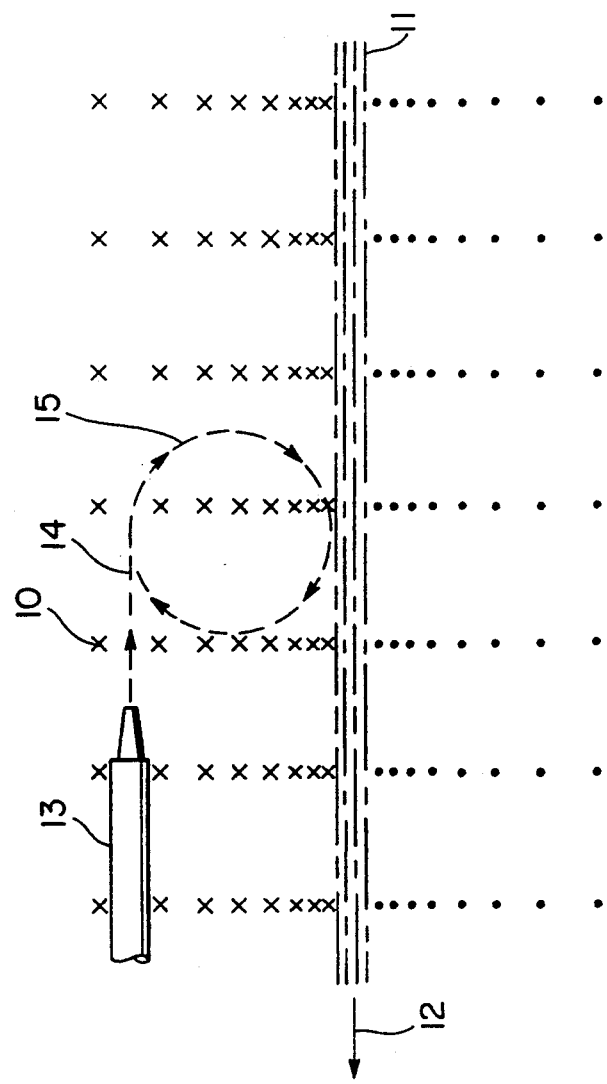
FIG. 1. Illustrates a view transversal to the charged particle.

The elements required to initiate an electron plasma toroid are an electron beam, a circular magnetic field, and a vacuum. Refer to FIG. 1. Circular magnetic field liens, 10, are shown. Using conventional notation, an "x" indicates field line in the direction into the page, where a "." indicates a line out of the page. A method of generating the circular magnetic field is shown using an electrical conductor or charged particle beam, 11, carrying an electrical current, 12, in the direction shown. It is noted that the conductor could be a single conductor, a series of conductors, or a charged particle beam as long as an electrical current is present which creates a sufficiently strong circular magnetic field. The atmosphere is a vacuum.

Figure 2:
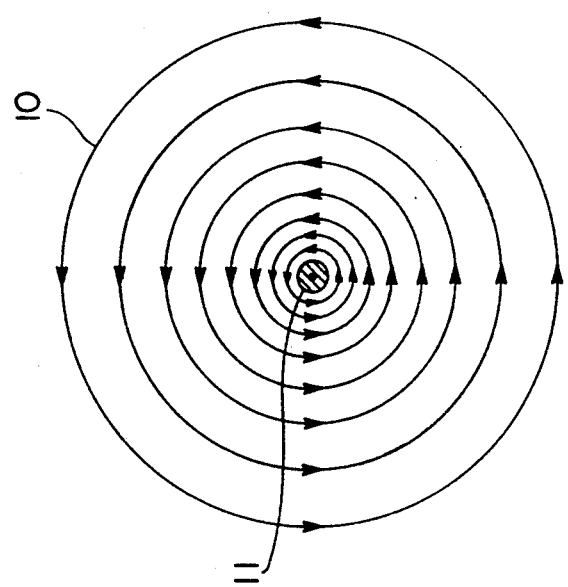
FIG. 2. A cross sectional view of the circular magnetic field taken perpendicular to the conductor.

An electron beam source, 13, is used to initiate an electron beam, 14. The electron beam will curve as shown due to the presence of the magnetic field in accordance with $F = Bvq$, a basic law of physics where F is force, B is magnetic field strength, V is particle velocity, and q is particle charge. The electron beam can be replaced with a charged particle beam, either positively or negatively charged, although care must be taken to allow for proper rotation in the circular magnetic field in accordance with the laws of physics. The shape of the orbit is defined by the balance of forces $F = Bvq$ and $F = mv^2$ where m is the mass of the particle. If the circular magnetic field and rotational force of the charged particle are in balance, similar to a cyclotron, the beam will form a circular orbit as shown, 15. The circular magnetic field is shown in a view perpendicular to the conductor in FIG. 2.

Figure 3:
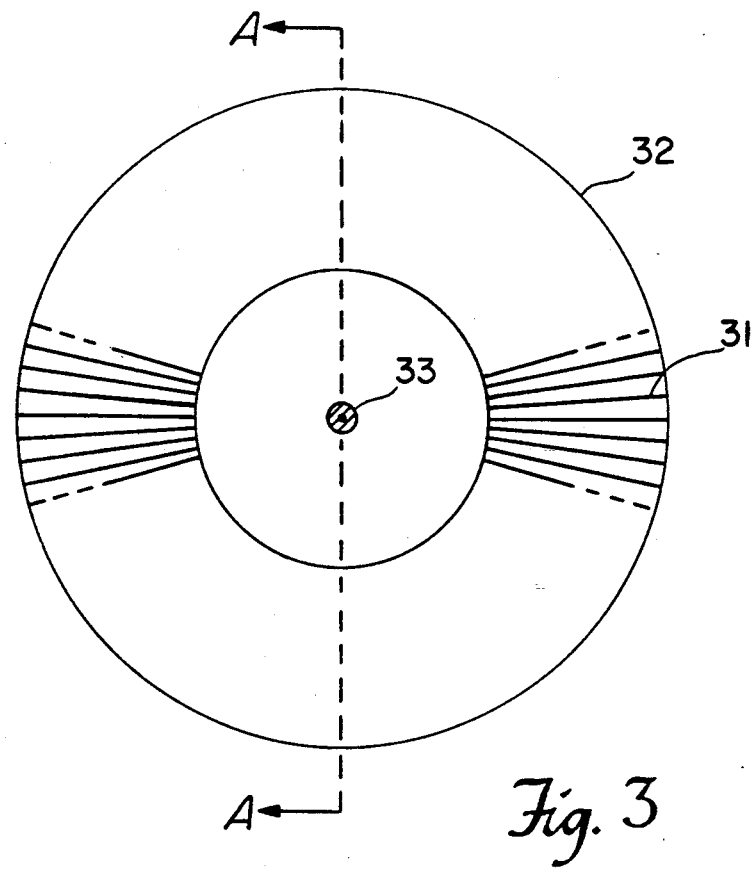
FIG. 3. Provides a top view of the toroidal plasma.

As the electrons rotate in the magnetic field, multiple orbits will form. The multiple orbits will spread out in to a spiral since like charges repel. The electron beam can be slightly at an angle to the axis of the conductor to facilitate the spreading and spiraling of the electrons. Referring to FIG. 3; as the electrons spread out, they remain int he orbits, 31, as shown typically by item 31, due to the force of the circular magnetic field, but spread as shown into a toroid, 32. This results in an electron plasma toroid. The orbits are connected as one large spiral. The number of orbits can vary. If the electrons are replaced with charged particles, the result is a charged particle plasma toroid.

Figure 4:
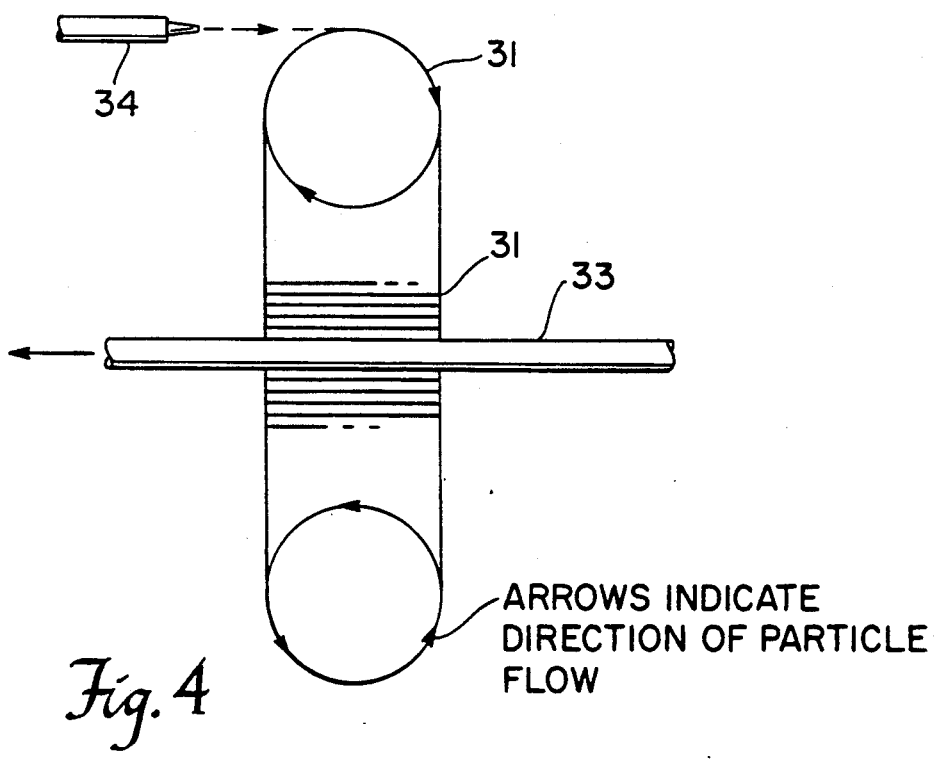
FIG. 4. Provides a cross sectional view of the toroidal plasma.
Figure 8:
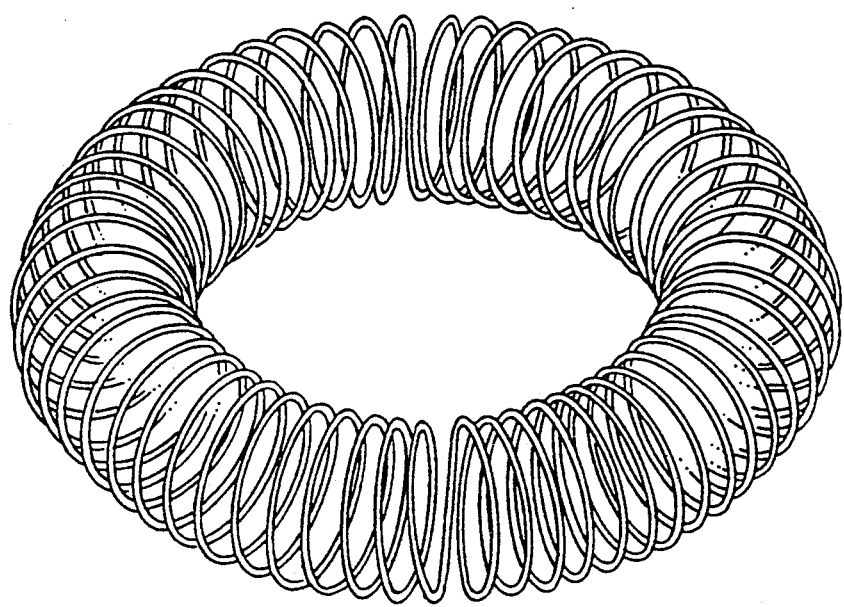
FIG. 8. A perspective view of the toroidal geometry of the plasma having a spiral structure.

In FIGS. 4, note the conductor, 33, and the electron beam generator, 34. The details of the circular magnetic field are omitted in FIGS. 3 and 4 to allow a clearer picture of the toroid, but would be similar to those shown in FIGS. 1 and 2.

Several items are hereby noted: (1). The orbit of the electrons is generally circular, but may vary somewhat from circular as a function of the change in strength of the magnetic field as the distance from the conductor increases. (2). In a typical configuration, the injected electron velocity is approximately $5 \times 10^7$ Meters/Second. The velocity can vary from higher to lower values as long as the balance of forces is maintained. The velocity of all the electrons is substantially uniform. (3). The circular magnetic field can be that which is created by an electrical current of approximately 3000 to 6000 amperes in a single conductor. The current may vary theoretically from higher to lower values as a function of force required to retain the electrons in orbit. (4). The circular magnetic field can be generated in many ways. The conductor approach is perhaps the simplest in concept. The conductor can be replaced with a charged particle beam. (5). A particle beam and a plasma are best generated and maintained in a vacuum where the absence of atmosphere will prevent collisions between gas molecules and particles. While the plasma is reported to exist in air in nature, the collisions with air molecules causes the plasma to be short lived in air. Vacuum levels required to establish a particle beam are well known. As a rule the better the vacuum the fewer collisions and the longer the life of the plasma. (6). When the electron plasma toroid has been initiated, the original circular magnetic field can be removed and the electron plasma toroid will retain its shape if a sufficient number of electrons are in the plasma. This is a unique feature of the toroidal geometric shape. This occurs because the electrons are in a predictable orbit and thus create a predictable current and magnetic field. The amount of charge required varies as required to maintain the balance of forces.

FIGS. 5, 6 and 7 shows an alternate method for initiating a charged particle toroid. The required circular magnetic field is initiated by utilizing a conductor toroid consisting of an electrical conductor, 40, wound in the shape of a toroid, 41 around a casing. The casing would typically be nonmetallic and made of a suitable material such as glass which can withstand a vacuum. The casing is shown in FIG. 6, and 7 as item 42. The circular magnetic field, shown schematically in FIG. 6, and 7 as 43, will be created when a current is sent through the electrical conductor. The field lines 43 are parallel to the circular axis of the spiral 46. The number of windings required is a function of the circular magnetic field strength required and the strength of the electrical current which flows through the electrical conductor. The number of windings required is a function of the circular magnetic field strength required and the strength of the electrical current which flows through the electrical conductor. With 100 turns in the conductor toroid, the circular magnetic field created by 30 to 60 amperes would be comparable t the circular magnetic field generated by a 3000 to 6000 ampere current in a single conductor. The number of windings is shown schematically in FIG. 5 and 7 and will vary depending on current per conductor and magnetic field required. An electron beam source, 44, is used to initiate an electron beam, 45. The beam spreads out into an electron plasma toroid inside the conductor toroid. A typical orbit is shown, 46, which spreads into a spiral as described previously in FIG. 3.

Several items are hereby noted and disclosed: (1) The coil can be elongated into an oval form and still maintain a plasma of a fixed geometry, although not toroidal. (2) The coil can be altered in an infinite number of slight variations but still maintain a plasma of fixed geometry (slightly varied from toroidal).

What I claim is:

1. A fixed geometry charged particle energy storage device comprising;
    a vacuum chamber for housing a plurality of charged particles;
    a magnetic field generating means for providing a magnetic field having closed magnetic field lines within the vacuum chamber; and
    injecting means for providing a plurality of charged particles each having the same electrical charge, the charged particles being injected into a predetermined path within the chamber and having a substantially uniform velocity such that said path comprises a spiral about an axis that is parallel to a closed magnetic field line of the magnetic field, the spiral having a fixed geometry relative to the vacuum chamber.

2. A fixed geometry charged particle generator as recited in claim 1 wherein the charged particles are electrons.

3. A fixed geometry charged particle generator as recited in claim 1 wherein the fixed geometry of the charged particles is a toroid.

4. A fixed geometry charged particle generator as recited in claim 1 wherein the magnetic field generating means for providing a circular magnetic field is a conductor.

5. A method of generating a fixed geometry of charged particles for energy storage comprising the steps of:
    providing a vacuum chamber for housing a plurality of charged particles;
    forming a magnetic field having closed magnetic field lines within the chamber; and
    injecting the plurality of charged particles into said field, each particle having the same electrical charge such that the field causes the particles to follow a path that spirals within the chamber about a closed magnetic field line of the field.

6. The method as recited in claim 5 wherein the magnetic field is generated by a conductor.

7. The method as recited in claim 5 wherein the magnetic field is generated by a conductor coil.

8. The method as recited in claim 5 wherein the charged particles are electrons.

9. The method as recited in claim 5 wherein the fixed geometry of charged particles is a toroid.

10. An energy storage device for providing a fixed geometry of charged particles comprising:
- a toroidally shaped vacuum chamber for housing a plurality of charged particles consisting essentially of electrons; and
- a magnetic field source positioned about the chamber wherein the plurality of electrons are contained in a spiral path at a substantially uniform velocity within the vacuum chamber by the magnetic field provided by the source within the vacuum chamber such that said path spirals substantially about magnetic field lines of the magnetic field in the shape of the toroid.

* * * * *